United States Patent [19]
Mercier

[11] 3,971,214
[45] July 27, 1976

[54] ASSISTED HYDRAULIC CONTROL

[76] Inventor: Bernard Mercier, 8 Chemin Jean Jullien, Ville d'Avray (Hauts de Seine), France

[22] Filed: Mar. 19, 1975

[21] Appl. No.: 559,836

[30] Foreign Application Priority Data
Mar. 29, 1974 France .............................. 74.11178

[52] U.S. Cl. .................................. 60/386; 60/402; 60/470; 91/391 R
[51] Int. Cl.² ......................................... F15B 15/18
[58] Field of Search ............ 60/386, 393, 400, 401, 60/402, 434, 470; 91/391 R, 415, 440

[56] References Cited
UNITED STATES PATENTS

| | | | |
|---|---|---|---|
| 1,909,166 | 5/1933 | Burrell | 60/467 |
| 3,218,805 | 11/1965 | Pruvot | 60/386 |
| 3,360,932 | 1/1968 | Lech et al. | 60/386 |
| 3,878,763 | 4/1975 | Lang | 91/391 R |

*Primary Examiner*—Edgar W. Geoghegan
*Attorney, Agent, or Firm*—Arthur B. Colvin

[57] ABSTRACT

The invention relates to an assisted hydraulic control, especially for steering all types of vehicles, and comprising a double-acting receiver or hydraulic cylinder, the piston of which forms two chambers in the cylinder, the piston rod extending into one of the chambers only and having no counter-rod extending into the other chamber. The first chamber thus has a smaller effective section than the second chamber, and the resulting asymmetry of operation of the piston and therefore of the steering is compensated by an arrangement in which the distributor valve means of the control, which couples a return conduit to the second of two actuating conduits in a first working position, isolates the return conduit and connects together the second of two pilot conduits, the second actuating conduit and the first actuating conduit in the second working position.

The conditions of actuation are thus rendered exactly symmetrical for both directions of working when the section of the first chamber is equal to one-half the section of the second chamber. The distributor valve is controlled in dependence on the direction of working of the pilot pump by mechanical, hydraulic or electrical control means.

7 Claims, 9 Drawing Figures

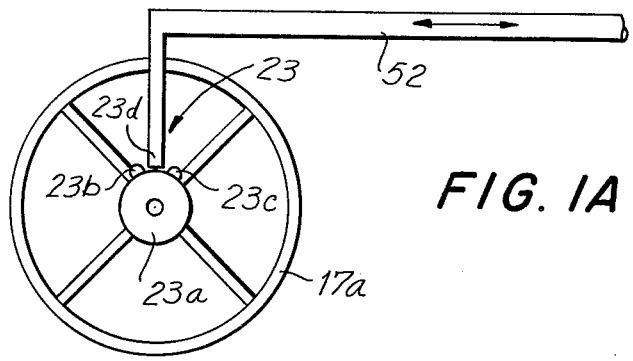
FIG. IA
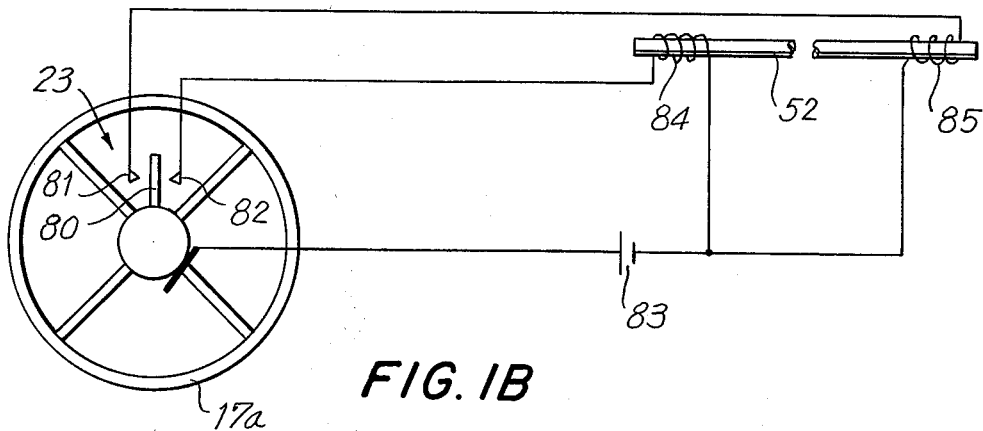
FIG. IB
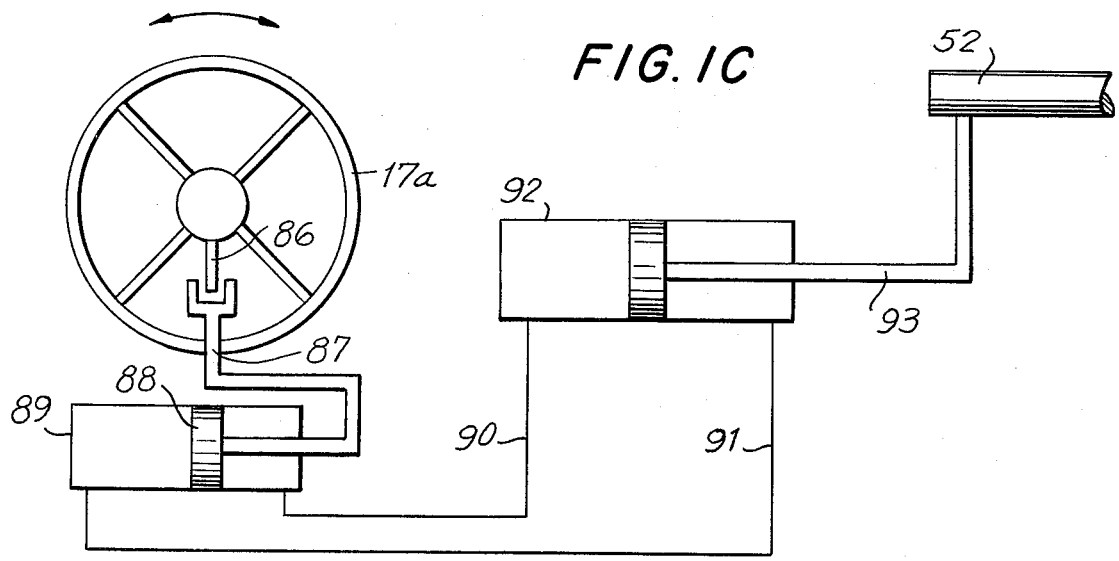
FIG. IC

ASSISTED HYDRAULIC CONTROL

The present invention relates to an assisted hydraulic control, especially for the steering of all sea, land or other vehicles, this control comprising a double-acting receiver means having a hydraulic cylinder or jack in which a piston defines a first and a second opposite chambers, a volumetric bi-directional pilot pump having a first and a second orifices, and operating either in a first direction in which it sucks in the fluid through the second orifice and delivers it through the first orifice, or in a second direction in which it sucks in the fluid through the first orifice and delivers it through the second orifice, a hydraulic station having a source of pressure and a tank, a distributor means, a pressure conduit interconnecting the source of pressure of the hydraulic station and the distributor means, a return conduit interconnecting the distributor means and the tank of the hydraulic station, a first and a second pilot conduits interconnecting on the one hand the distributor means and on the other hand the first and second orifices respectively of the pilot pump, a first and second actuating conduits interconnecting on the one hand the distributor means and on the other hand the first and the second chambers respectively of the receiver means, the said distributor means being switchable between three positions and being controlled by the direction of operation of the pilot pump, the said distributor means having a first working position towards which it is urged when the pilot pump is working in the first direction and in which it connects the pressure conduit with the second pilot conduit and connects the first pilot conduit with the first actuating conduit, the said distributor means having a second working position towards which it is urged when the pilot pump is working in the second direction and in which it connects the pressure conduit with the first pilot conduit and connects the second pilot conduit with the second actuating conduit, the said distributor means having a neutral position towards which it is elastically returned when the pilot pump is not working, and in which it isolates the pressure conduit from the pilot conduits.

The invention relates more particularly to an assisted hydraulic control of this type, in which, for the purposes of economy, the receiving means comprises a single jack, the piston of which has a rod which extends into one of the chambers, for example the first chamber and its free of any counter-rod in the second chamber, the first chamber thus having a smaller section than the second chamber, for example half the section.

In general, as the return conduit is coupled in the first working position to the second actuating conduit, and in the second working position to the first actuating conduit, the difference in sections of the chambers of the jack has the effect of introducing asymmetrical conditions into the operation of the piston according to the direction.

There exist in fact numerous applications, for example the steering of tractors or other vehicles, in which such asymmetrical conditions are accepted for the economy represented by a fluid motor, the piston of which has no counter-rod, but this system results in a driving technique which necessitates special precautions.

It is doubtless possible to consider the association with the fluid motor of pilot clapper-valves in order to restore symmetrical conditions of operation in both directions, but this results in a substantial increase of the cost of construction which, to give an idea, is of the same order of magnitude as the difference in price between an installation with a fluid motor having a counter-rod and an installation having a fluid motor without counter-rod.

According to the invention, as assisted hydraulic control is characterized in that the distributor means which couples, in the first working position, the return conduit to the second actuating conduit, is such that, in the second working position, it isolates the return conduit and connects together the second pilot conduit, the second actuating conduit and the first actuating conduit.

By virtue of this arrangement, in the second working position, the distributor means supplies the second chamber of larger section with a flow-rate which includes the volume expelled from the first chamber, which tends to make symmetrical the conditions of actuation in both directions, and this without substantial increase in the cost of the construction. It will be appreciated that the conditions of actuation are rendered exactly symmetrical in both directions when the section of the first chamber is equal to one-half the section of the second chamber.

Forms of embodiment of the invention are described below, by way of example, reference being made to the accompanying drawings, in which:

FIG. 1a is a diagrammatic view showing a means for imparting initial movement to the valve stem by mechanical apparatus;

FIG. 1b is a diagrammatic view showing a means for imparting initial movement to the valve stem by electrical means;

FIG. 1c is a diagrammatic view showing a means for imparting initial movement to the valve stem by hydraulic means;

Figure 1:
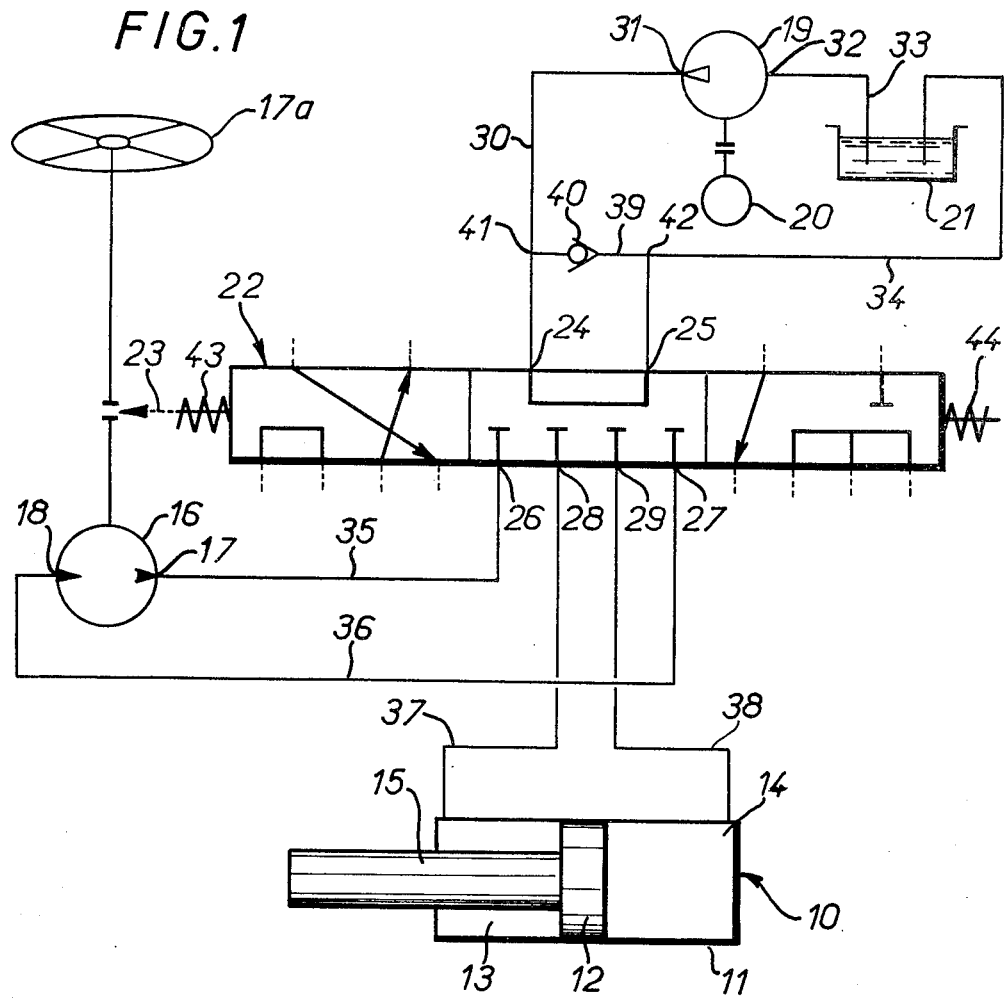
FIG. 1 is a diagrammatic view of a hydraulic control according to the invention, with a distributor having an open center.

Reference will first be made to FIG. 1, in which there is shown diagrammatically an assisted hydraulic control, especially for the steering of a vehicle of any kind, for example for sea, land or other, for example the steering of a tractor.

There can be seen at 10 in FIG. 1 a double-acting receiver means having a cylinder 11 in which a piston 12 defines a first chamber 13 and a second opposite chamber 14. The piston 12 has a rod 15 which extends into the first chamber 13 and gives this chamber a section smaller than that of the second chamber 14. In the example shown in FIG. 1, the section of the chamber 13 is equal to one-half the section of the chamber 14.

It is the displacement of the rod 15 of the piston 12 which causes the change in direction, and, in the example of application to a tractor, causes the change of orientation of the steering wheels of the tractor.

The assisted hydraulic control also comprises a volumetric bi-directional pilot pump 16 which can operate either in one direction or in the other by the action of an operating member, for example a steering-wheel 17a in the case of a tractor.

The pump 16 has a first orifice 17 and a second orifice 18. When the steering-wheel 17a is turned in a first direction, for example to the left, the pump 16 works in this first direction by sucking in the fluid through the second orifice 18 and expelling it through the first orifice 17. When the steering-wheel 17a is actuated in a second direction, for example to the right, the pump 16 works in this second direction by sucking in the fluid through the first orifice 17 and expelling it through the second orifice 18.

The assisted hydraulic control also comprises a hydraulic station having a source of pressure 19 such as a pump driven by a motor 20, and a tank 21.

The pump 19 delivers through an orifice 31 into a pressure conduit 30 and sucks in the fluid through an orifice 32 in a conduit 33 from the tank 21.

The assisted hydraulic control further comprises a distributor means 22 which is switchable between three positions and which, by virtue of control means of a type known per se and shown diagrammatically at 23, is controlled in dependance on the direction of operation of the pilot pump 16.

The control means 23 may comprise either mechanical means or hydraulic means or electric means or simultaneously two or more of any of these means.

By way of example and with reference to FIG. 1a, the control means 23 may comprise a disk 23a having pins 23b, 23c to impart an initial movement to a tooth 23d carried by the slide valve 52.

In accordance with the electrical apparatus of FIG. 1b, rotation of the steering wheel 17a will cause a movable electrical contact 80 to engage one or the other of contacts 81, 82. A battery 83, by closing of one or the other of the circuits, is caused to energize solenoid 84 or 85 to induce initial shifting of the valve stem 52.

In accordance with the hydraulic apparatus of FIG. 1c, steering wheel 17a carries a drive finger 86 which moves fork 87 fixed to piston member 88 in one or another direction, depending upon the sense in which the wheel 17a is rotated. As a result of movement of the piston 88 in cylinder 89, fluid is moved in one of the conduits 90 or 91. The conduits 90, 91 are connected to the opposite ends of a second double acting cylinder 92, the piston assembly 93 of which is connected to the valve stem 52 of the distributor 22.

It will be appreciated that the means illustrated in FIGS. 1a, 1b, 1c are schematic and diagrammatic illustrations only, suitable mechanical, electrical and hydraulic mechanisms being well known in the art.

The distributor means 22 is provided with six orifices 24, 25, 26, 27, 28 and 29.

The pressure conduit 30 interconnects the delivery orifice 31 of the pump 19 and the orifice 24 of the distributor 22. A return conduit 34 interconnects the orifice 25 of the distributor 22 and the tank 21. A first pilot conduit 35 interconnects the orifice 26 of the distributor 22 and the first orifice 17 of the pilot pump 16. A second pilot conduit 36 interconnects the orifice 27 of the distributor 22 and the second orifice 18 of the pilot pump 16. A first actuating conduit 37 interconnects the orifice 28 of the distributor 22 and the first chamber 13 of the jack 10. A second actuating conduit 38 interconnects the orifice 29 of the distributor 22 and the second chamber 14 of the jack 11.

There can be seen at 39 a conduit comprising a one-way clapper-valve 40 interposed between the pressure conduit 30 at 41 and the return conduit 34 at 42 in order to permit the actuation of the control manually with the sole assistance of the pilot pump 16 in the case where the pump 19 or motor 20 were to fail.

The distributor 22 has a first working position (shown by the left-hand compartment of the diagrammatic representation of the distributor in FIG. 1) towards which it is urged when the steering-wheel 17a is turned towards the left and when the pump 16 is working in the first direction. In this position, the distributor 22 couples the orifice 24 to the orifice 27, the orifice 29 with the orifice 25 and the orifice 26 with the orifice 28.

In this case, the liquid delivered by the pump 19 into the conduit 30 passes from 24 to 27 into the conduit 36, passes through the pilot pump 16 from 18 to 17, passes into the conduit 35 and passes from 26 to 28 into the conduit 37 where it is admitted to the first chamber 13 of small section which increases in volume and displaces the piston 12 in a first direction (from left to right in FIG. 1). The liquid from the large chamber 14 is delivered through the conduit 38 and passes from 29 to 25 into the conduit 34 which returns to the tank 21.

The distributor 22 has a second working position (shown by the righ-hand compartment of the diagrammatic representation of the distributor in FIG. 1) towards which it is urged when the steering-wheel 17a is turned towards the right and when the pump 16 is working in a second direction. In this position, the distributor 22 couples the orifice 24 to the orifice 26; it isolates the orifice 25 and it connects to each other the orifices 27, 28 and 29.

In this case, the liquid delivered by the pump 19 into the conduit 30 passes frm 24 to 26 into the conduit 35, passes through the pilot pump 16 from 17 to 18, passes into the conduit 36 and passes from 27 to 29 into the conduit 38 from which it is admitted to the second chamber 14 of large section, which increases in volume and moves the piston 12 in a second direction (from right to left in FIG. 1).

The liquid from the small chamber 13 is delivered through the conduit 37 and passes from 28 to 29 into the conduit 38 which is thus supplied, not only by the flow from the pilot pump 16 through 36, but also by the return flow through 37, which tends to render the conditions of actuation of the piston 12 symmetrical in both directions. These conditions of actuation are made exactly symmetrical in both directions in the example shown, in which the section of the first chamber 13 is equal to one-half the section of the second chamber 14.

The distributor 22 has a third position which is a neutral position and towards which it is returned elastically by springs 43 and 44 when the steering wheel 17a is stationary and when the pilot pump 16 is not working.

This neutral position is shown by the central compartment in the diagrammatic representation of FIG. 1. In this neutral position, the distributor 22 couples the orifice 24 to the orifice 25 and isolates each of the orifices 26, 27, 28 and 29.

In this case, the liquid delivered by the pump 19 into the conduit 30 passes from 24 to 25 and returns to the tank 21 through the conduit 34.

It will be appreciated that the assisted hydraulic control which has just been described makes possible symmetrical conditions of actuation with an economic construction, since the piston 12 has no counter-rod, while the distributor 22 comprises an arrangement which does not appreciably affect the cost of construction.

It should be noted that the distributor 22 may be of any suitable type comprising fixed body means with six orifices and at least one portion which is arranged inside and is movable with respect to the said fixed body means. This movable internal portion may comprise either a slide-valve or a rotating cock, or an assembly of rotatable concentric sleeves, the said sleeves being relatively displaceable, linearly or angularly, or any other appropriate arrangement so as to permit in each case the switching over of the distribution means between the three positions.

Figure 2:
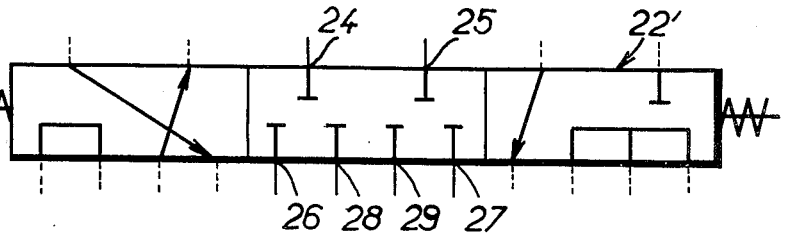
FIG. 2 shows an alternative form of distributor having a closed center.

The distributor 22 which has been shown with an open center in FIG. 1 may be provided with a closed center as shown in FIG. 2. In this case, the distributor referenced at 22' is similar to the distributor 22 of FIG. 1 with the left-hand and right-hand compartments identically the same. However, in the central case corresponding to the neutral, the orifices 24 and 25 are made isolated in FIG. 2 instead of being coupled together as shown in FIG. 1.

Figure 3:
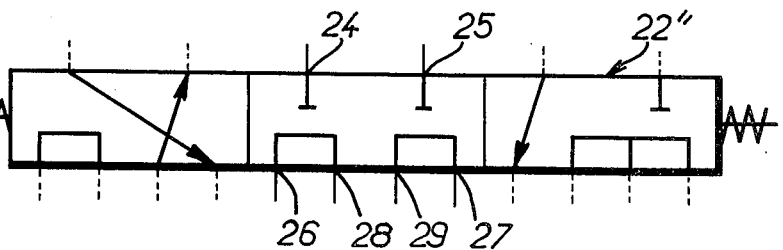
FIG. 3 is another alternative form of distributor having a reaction-free effect.

The distributor may also be of the double-acting reaction type such as that shown in FIG. 3. In this case, the distributor 22" has the left-hand and right-hand compartments identical to those of the distributor 22 of FIG. 1 or of the distributor 22' of FIG. 2. However, in the central compartment corresponding to the neutral position, it connects together the orifices 26 and 28 and it also connects the orifices 27 and 29 together. In the neutral position, the distributor 22" of FIG. 3 may either be arranged to connect the orifices 24 and 25 to each other, as in FIG. 1, or to isolate them as in FIG. 2, this being shown by way of example in FIG. 3.

It should be noted that the distributor means 22 or 22' or 22" may be of one single piece as it has been shown, or it may be made of two or more separate bodies. The distributor means 22 and the pilot pump 16 are preferably comprised of a one-piece assembly.

Figure 4:
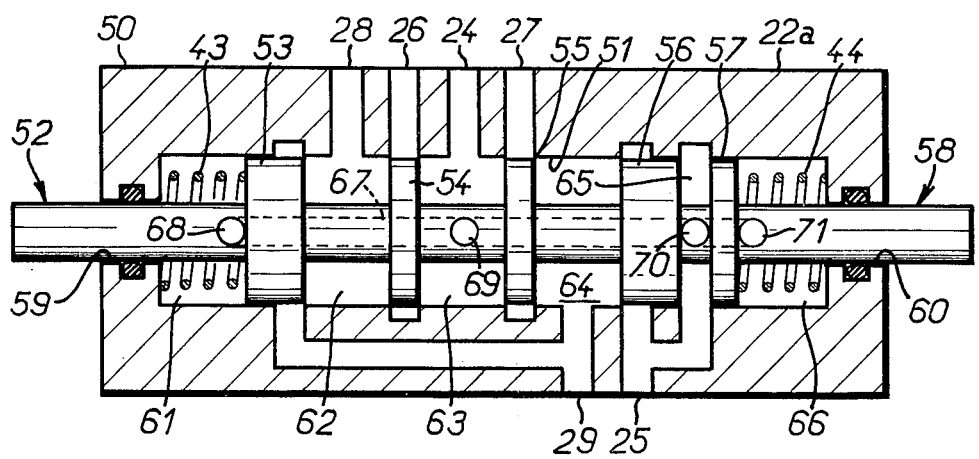
FIG. 4 shows diagrammatically a method of construction of a distributor with a slide-valve, in the neutral position.
Figure 5:
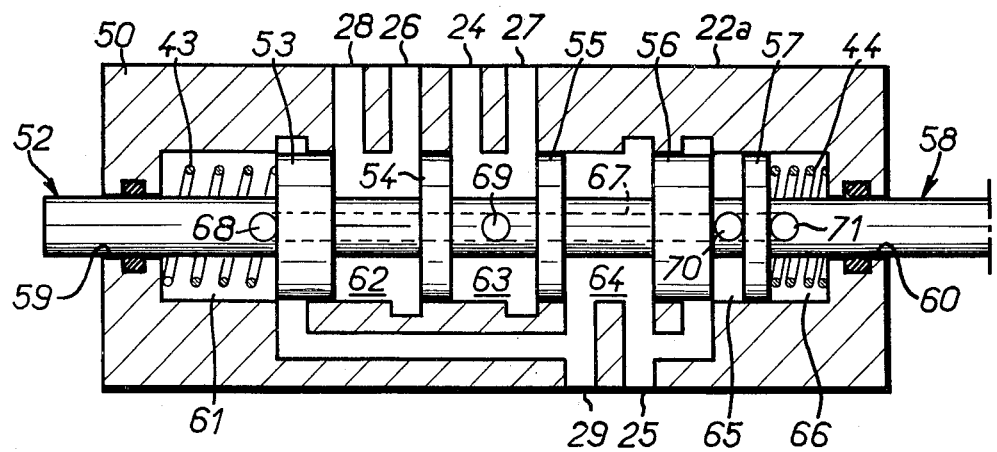
FIG. 5 is a view similar to FIG. 4 but shows the distributor in a working position.
Figure 6:
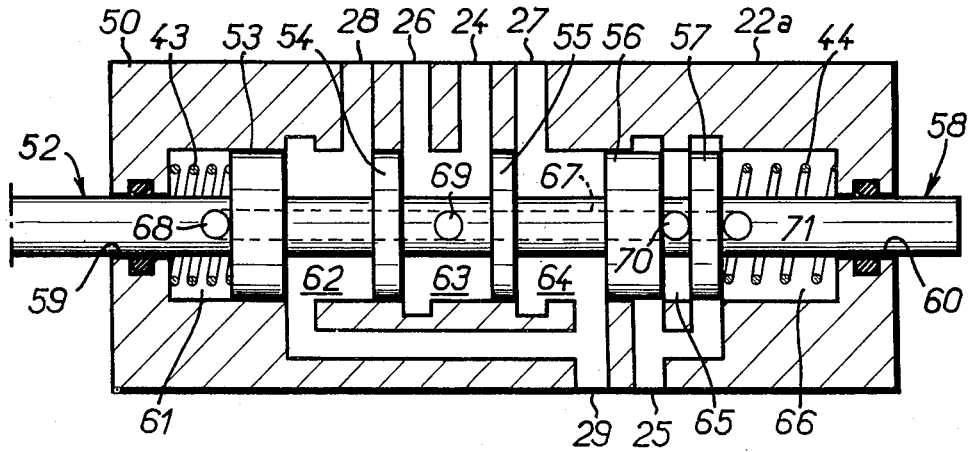
FIG. 6 is a view similar to FIGS. 4 or 5, but shows the distributor in another working position.

Reference will now be made to FIGS. 4 to 6 which relate to a particular form of construction of the distributor, which is, for example, of the slide-valve type with a linear sliding motion, with an open center and without reaction effect.

The distributor shown diagrammatically in FIGS. 4 to 6, designated by 22a, comprises a body 50 having a bore 51 in which slides a slide-valve 52. This latter is provided with five cylindrical bearing surfaces 53, 54, 55, 56 and 57 and a rod 58 which is slidably engaged in the end bearing surfaces 59 and 60 of the bore 51.

The bearing surfaces 53, 54, 55, 56 and 57 form six chambers in the bore 51, of which one chamber 61 is arranged on the left of the surface 53, another chamber 62 is arranged between the surfaces 53 and 54, while another chamber 63 is arranged between the surfaces 54 and 55, another chamber 64 being formed between the surfaces 55 and 56, another chamber 65 is formed between the surfaces 56 and 57 while the last chamber 66 is arranged to the right of the bearing surface 57.

The rod 58 has formed therein an axial channel 67 having four orifices of which one 68 communicates with the chamber 61, another orifice 69 communicates with the chamber 63, another orifice 70 communicates with the chamber 65, and the last orifice 71 communicates with the chamber 66.

The restoring springs 43 and 44 for bringing the distributor into the neutral position are arranged respectively, in the example shown, in the end chambers 61 and 66.

The body 50 has formed therein the six orifices 24, 25, 26, 27, 28 and 29 which have been described with reference to FIG. 1 and which are arranged as shown in FIG. 4. The neutral position can be seen in FIG. 4, the first working position in FIG. 5 and the second working position in FIG. 6.

The orifice 24 communicates continuously with the chamber 63 (see FIGS. 4, 5 and 6).

The orifice 25 communicates with the chamber 65 in the neutral position (see FIG. 4). It communicates with the chamber 64 in the first working position (see FIG. 5), and it is isolated by the bearing surfaces 56 and 57 in the second working position (see FIG. 6).

The orifice 27 is isolated by the bearing surface 55 in the neutral position (see FIG. 4) and it communicates with the chamber 63 in the first working position (see FIG. 5). It communicates with the chamber 64 in the second working position (see FIG. 6).

The orifice 26 is isolated by the bearing surface 54 in the neutral position shown in FIG. 4. It communicates with the chamber 62 in the first working position (see FIG. 5). It communicates with the chamber 63 in the second working position shown in FIG. 6.

The orifice 28 communicates continuously with the chamber 62 (see FIGS. 4, 5 and 6).

The orifice 29 communicates continuously with the chamber 64, as shown in FIGS. 4, 5 and 6. In addition, the orifice 29 communicates with the chamber 62 in the second working position (see FIG. 6) but is isolated from this chamber 62 by the bearing surface 53 in the neutral position (see FIG. 4) and in the first working position (see FIG. 5).

The distributor 22a which has just been described with reference to FIGS. 4, 5 and 6 enables the operation described to be achieved generally as described with reference to FIG. 1, since in the first working position (see FIG. 5) it connects the orifice 24 to the orifice 27 through the chamber 63; it connects the orifice 26 to the orifice 28 through the chamber 62 and it connects the orifice 29 to the orifice 25 through the chamber 64. In the second working position (see FIG. 6) it connects the orifice 24 to the orifice 26 through the chamber 63; it isolates the orifice 25 and it connects the orifices 27, 28 and 29 through the chambers 62 and 64 and in the neutral position of FIG. 4 the orifice 24 communicates with the orifice 25 through the chamber 63, the orifice 69, the channel 67, the orifice 70 and the chamber 65, the orifice 26 being isolated by the bearing surface 54, the orifice 27 being isolated by the bearing surface 55, the orifice 28 being isolated by the isolation of the chamber 62, and the orifice 29 being isolated by the bearing surface 53 and by the isolation of the chamber 64.

The particularly simple and economical construction of the distributor will be appreciated from FIGS. 4, 5 and 6.

What I claim is:

1. An assisted hydraulic control comprising a double acting receiver means having a cylinder in which a piston defines first and second opposite chambers, a bidirectional volumetric pilot pump having a first and a second orifice and working either in a first direction in which it sucks in fluid through the second orifice and delivers said fluid through the first orifice, or in a second direction in which it sucks in fluid through said first orifice and delivers it through the second orifice, a hydraulic station having a source of pressure and a tank, a distributor means, a pressure conduit interconnecting said source of pressure with said distributor means, a return conduit interconnecting the distributor means and said tank, a first and a second pilot conduit interconnecting said distributor means and respectively the first and second orifices of said pilot pump, a first and a second actuating conduit interconnecting the distributor means and the first and the second chambers respectively of said receiver means, said distributor means being switchable between three positions and being controlled in dependence on the direction of operation of said pilot pump, said distributor means having a first working position towards which it is urged when said pilot pump is operating in said first direction and in which it connects said pressure conduit with the second pilot conduit and connects the first pilot conduit to the first actuating conduit, said distributor means having a second working position towards which it is urged when the pilot pump is operating in said second direction and in which it connects the pressure conduit to said first pilot conduit and connects said second pilot conduit to the second actuating conduit, said distributor means having a neutral position towards which it is elastically returned when the pilot pump is not in operation, and in which it isolates said pressure conduit from said pilot conduits, said piston having a rod extending into said first chamber and giving said first chamber a section smaller than that of said second chamber, said distributor means connecting, in the first working position, said return conduit to the second actuating conduit; said hydraulic control having one single said distributor means further comprising a fixed body having six orifices, namely: a pressure orifice coupled to the pressure conduit of said hydraulic station, a return orifice coupled to said return conduit, a first pilot orifice coupled to said first pilot conduit, a second pilot orifice coupled to said second pilot conduit, a first actuating orifice coupled to said first actuating conduit and a second actuating orifice coupled to said second actuating conduit, said distributor means further comprising at least one moving portion arranged inside said fixed body in such manner that, in said second working position, the pressure orifice is coupled to said first pilot orifice, the return orifice is closed, and said second pilot orifice and the two actuating orifices are all three coupled together.

2. An assisted hydraulic control as claimed in claim 1, in which said distributor means is of the open-center type.

3. An assisted hydraulic control as claimed in claim 1, in which said movable internal portion comprises a slide-valve for switching over between the three positions of said distributor means.

4. An assisted hydraulic control as claimed in claim 1, in which said distributor means is controlled in dependence on the direction of operation of said pilot pump by control means comprising mechanical means.

5. An assisted hydraulic control as claimed in claim 1, in which said distributor means is controlled in dependence on the direction of operation of said pilot pump by control means comprising hydraulic means.

6. An assisted hydraulic control as claimed in claim 1, in which said distributor means is controlled in dependence on the direction of operation of the pilot pump by control means comprising electrical means.

7. A hydraulic control in accordance with claim 1 wherein the cross-sectional area of said piston in said first chamber, as a result of the presence of said rod, is one half the cross-sectional area of said piston in said second chamber.

* * * * *